C. L. COOKSON.
BALING PRESS.
APPLICATION FILED FEB. 21, 1913.
1,069,231.
Patented Aug. 5, 1913.
6 SHEETS—SHEET 6.
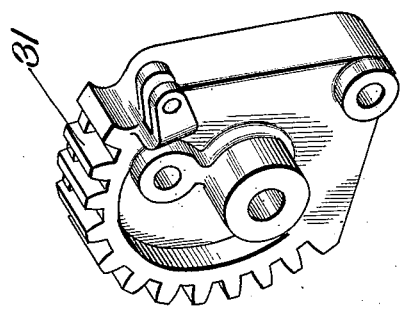
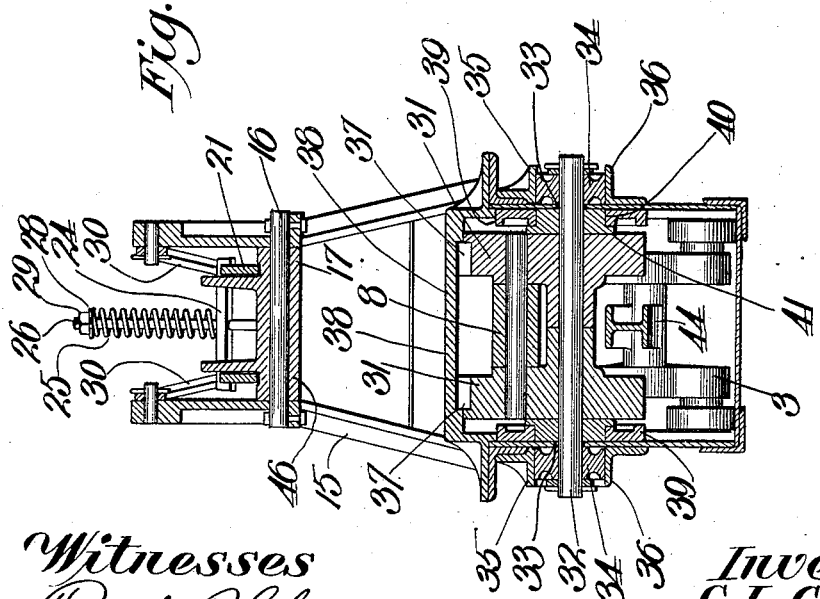
Witnesses
Frank R Glow
H. C. Rodgers
Inventor
C. L. Cookson
By George M Thorp Atty

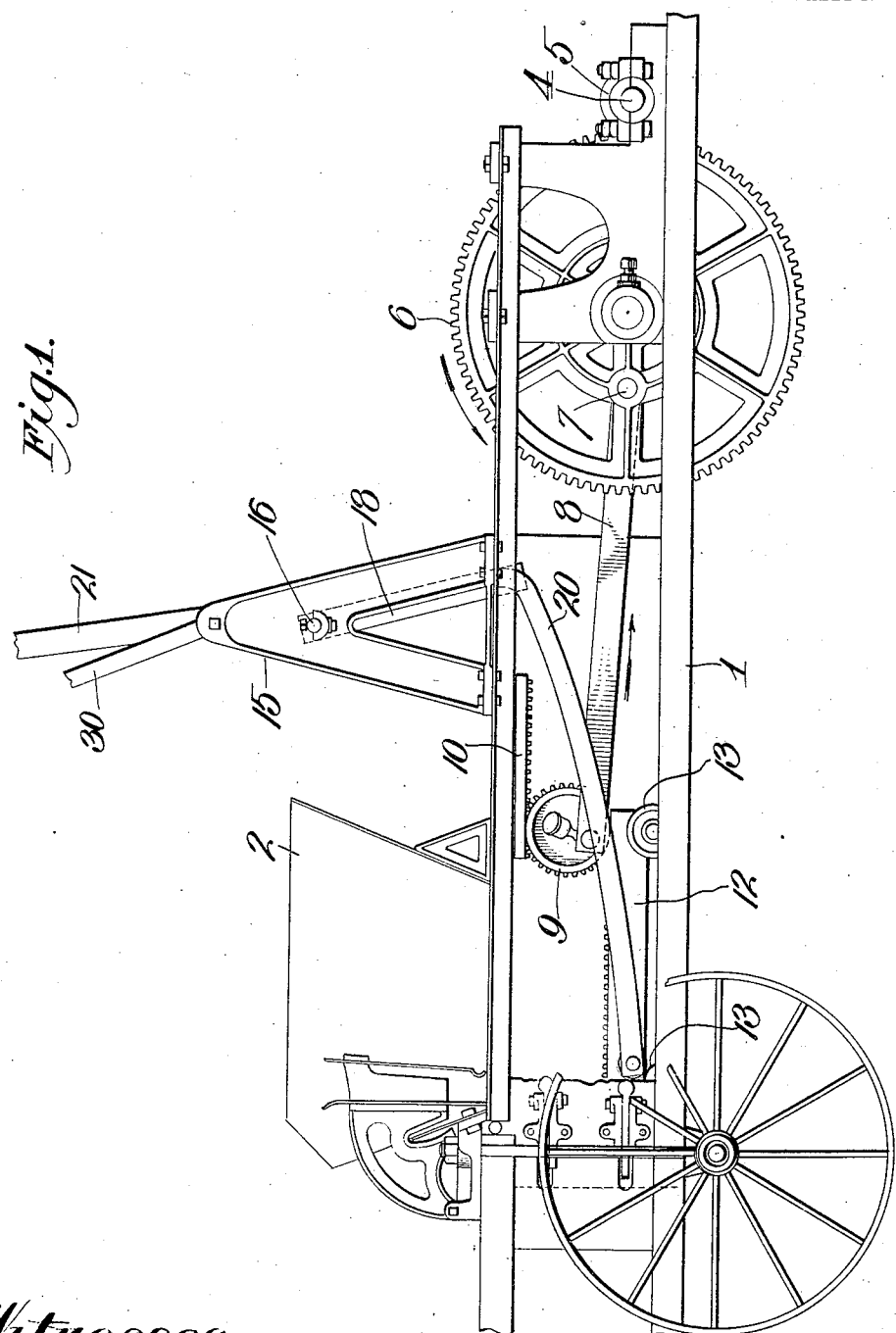

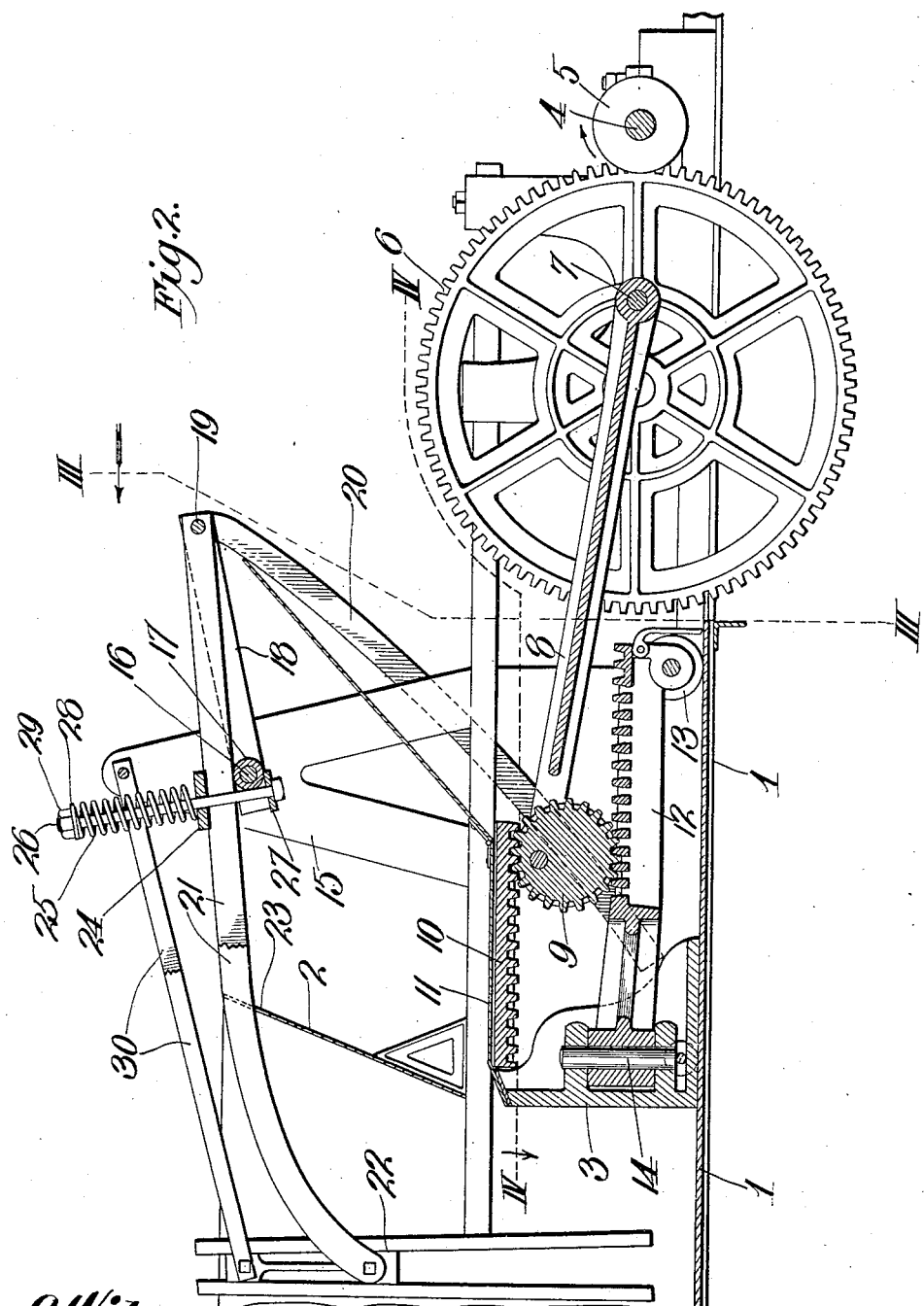

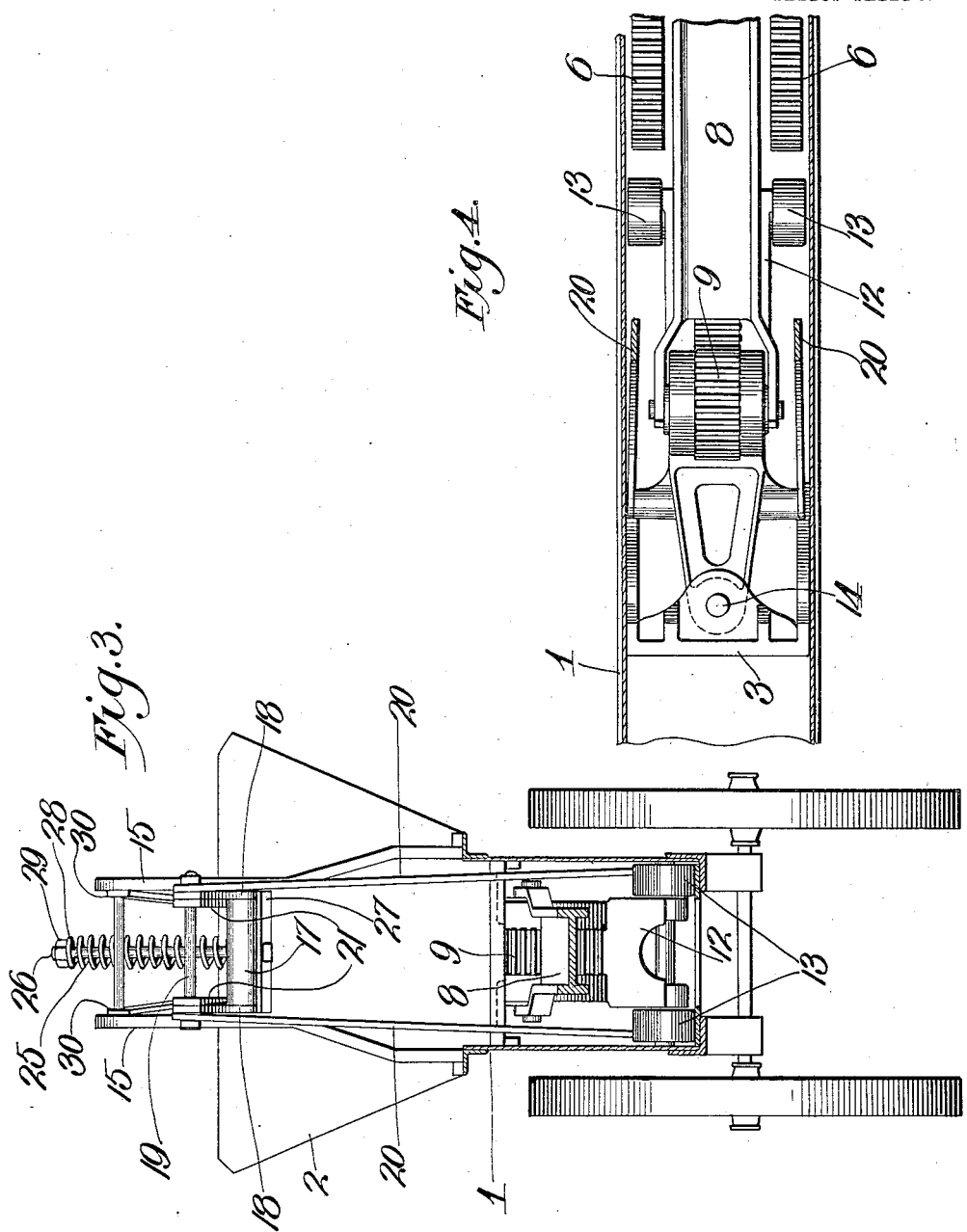

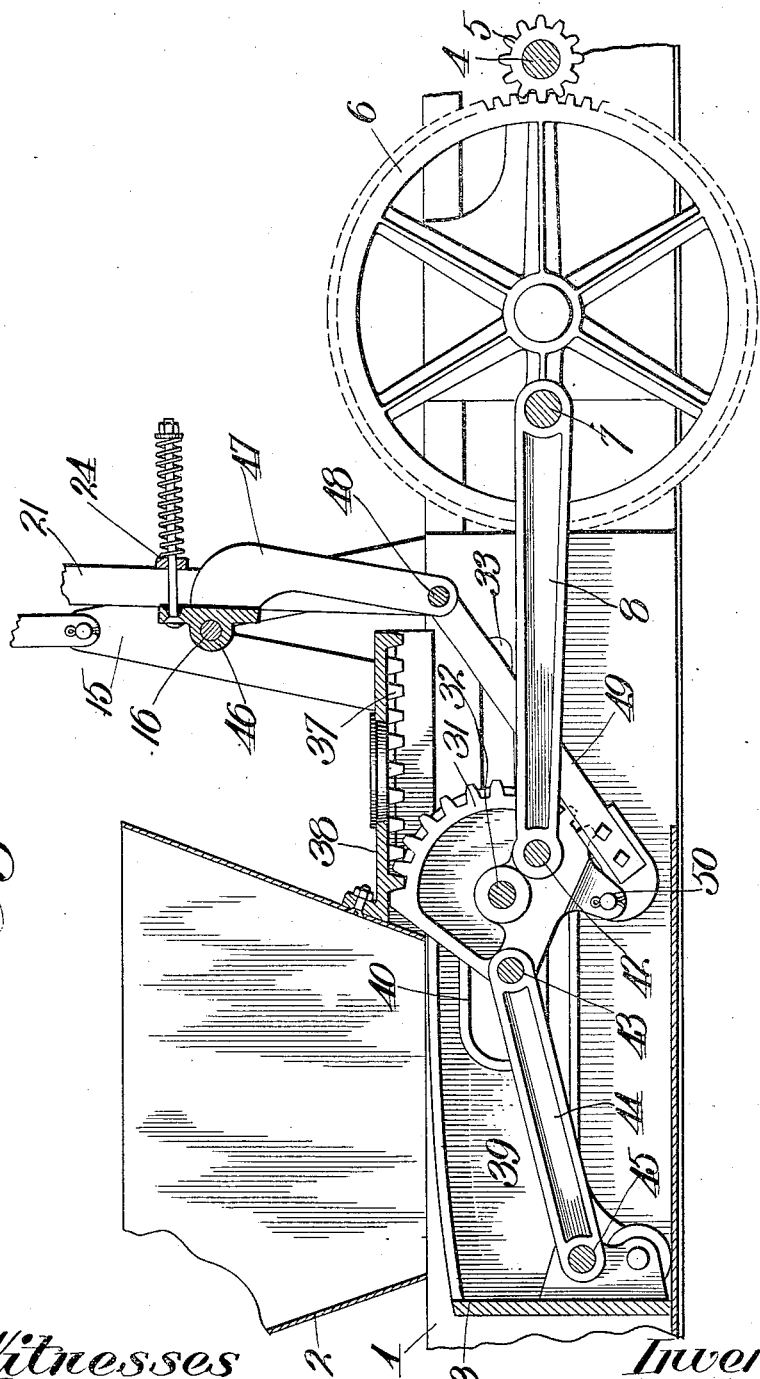

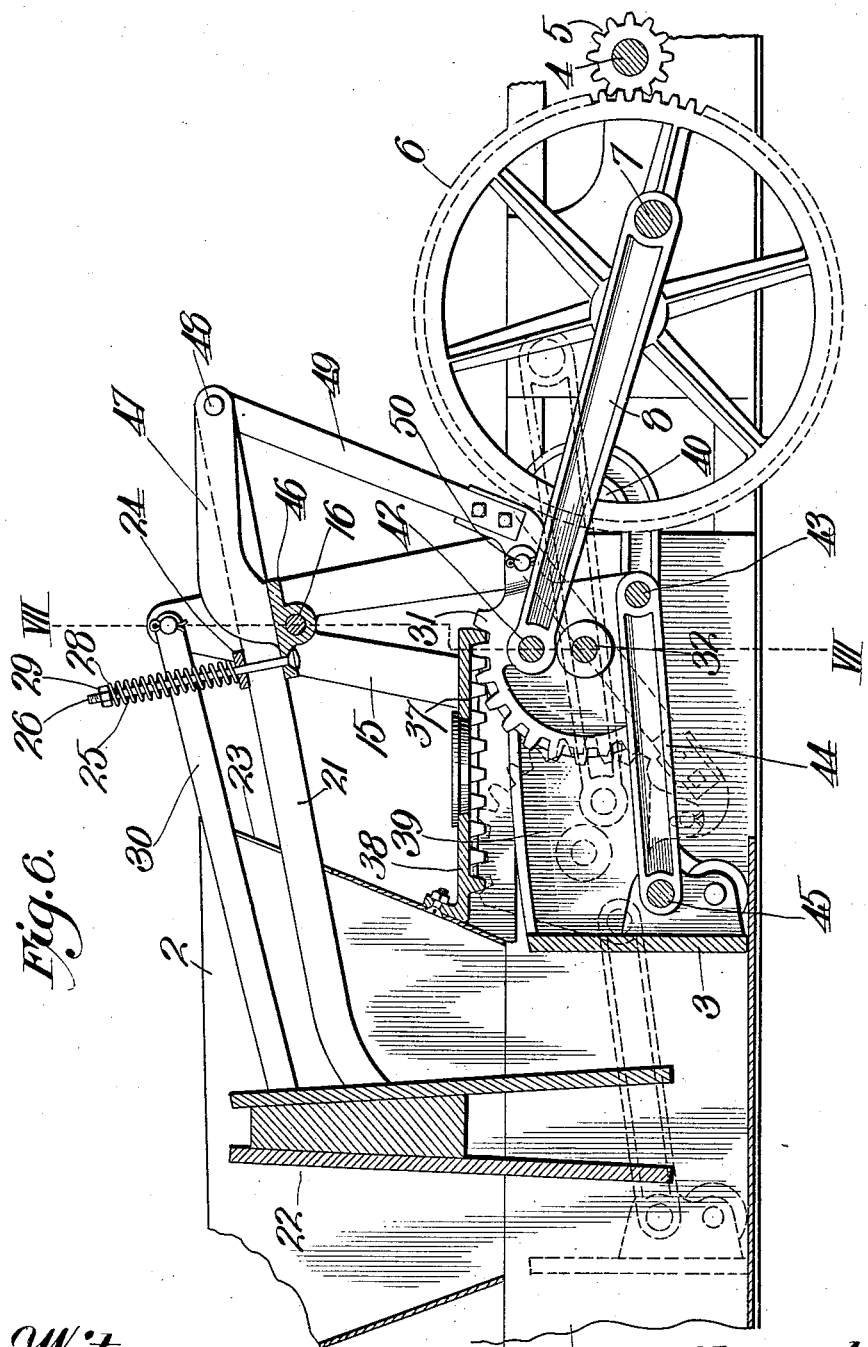

UNITED STATES PATENT OFFICE.

CHARLES L. COOKSON, OF KANSAS CITY, MISSOURI, ASSIGNOR TO ADMIRAL HAY PRESS COMPANY, OF KANSAS CITY, MISSOURI, A CORPORATION OF MISSOURI.

BALING-PRESS.

1,069,231.    Specification of Letters Patent.    Patented Aug. 5, 1913.

Application filed February 21, 1913. Serial No. 749,851.

*To all whom it may concern:*

Be it known that I, CHARLES L. COOKSON, a citizen of the United States, residing at Kansas City, in the county of Jackson and State of Missouri, have invented certain new and useful Improvements in Baling-Presses, of which the following is a specification.

This invention relates to baling presses and has for its object to produce a machine of this character having a longer stroke and capable of exerting greater power in such stroke than machines of the same general character and length.

Another object is to produce a baling press provided with mechanism whereby the maximum power which could be applied directly by the pitman on the baling material is increased on the latter at a loss of speed on the part of the plunger or head block.

Another object is to produce a baling press having an automatically operating feeder and means whereby the power of the operative stroke of the feeder is increased as the resistance offered to the feeder by the baling material is increased by the compacting or condensing of the latter in the baling chamber.

With these general objects in view the invention consists in certain novel and peculiar features of construction and organization as hereinafter described and in order that it may be fully understood reference is to be had to the accompanying drawings, in which—

Figure 1, is a side elevation of a part of a baling press embodying my invention. Fig. 2, is an enlarged central vertical longitudinal section of a part of the press. Fig. 3, is a section on the line III—III of Fig. 2. Fig. 4, is a section on the line IV—IV of Fig. 2 with part of the crank shaft mechanism in elevation. Fig. 5, is a central vertical longitudinal section of a part of a press embodying certain changes of construction from the press shown in the preceding figures. Fig. 6, is a similar view but with the plunger at the beginning instead of at the end of its stroke as in Fig. 5. Fig. 7, is a vertical transverse section on the line VII—VII of Fig. 6. Fig. 8, is a detail perspective view of one member of the pinion segment shown on Sheets 4 to 6 inclusive.

The frame 1 of the press is of the customary construction as shown and 2 indicates the usual hopper and 3 the reciprocatory head block or plunger.

4 is a shaft adapted to be driven by an engine or belt and provided with a pair of pinions 5 meshing with the large gear wheels 6 journaled in the frame of the machine and connected together by a cross pin 7, which pin in conjunction with the wheels 6 constitute a crank connected pivotally by a pitman 8 with a gear toothed pinion 9, the connection being outward of the center of the pinion for a purpose which hereinafter appears, and said pinion engages a rack bar 10 extending longitudinally of and rigid with the frame. In Figs. 1 to 4 inclusive, the apron 11 of the head block or plunger operates above said rack bar and between the sides of the frame, as shown clearly in Fig. 2.

Underlying and engaging the pinion 9 is a rack bar 12 adapted to travel longitudinally upon the bottom of the baling case and mounted at its rear end upon a pair of rollers 13 and pivotally connected at its front end to the head block or plunger by a pin 14.

15 are standards mounted upon the frame and forming a support and journal for a transverse shaft 16, and mounted pivotally upon said shaft between the ends of the spacing sleeve 17 thereon and said standards 15, is a pair of swing arms 18, connected at their outer ends by a cross pin 19.

20 is a pair of links pivotally connecting cross pin 19 with rack bar 12, at opposite sides of the pinion 9 for the purpose of imparting rocking movement to arms 18 and a pair of levers 21 which are pivoted on cross pin 19, and rest on sleeve 17 and pivotally carry at their front ends a presser foot 22 for forcing baling material from the hopper into the baling chamber, the upper end of the hopper being notched at 23 to accommodate the levers 21.

24 is a clamp plate bridging the space between levers 21 and resting upon the upper edges of the same, and 25 is a spring for causing said plate 24 to hold the levers 21 pressed yieldingly against the sleeve 17, the spring being held in position by means of a bolt 26, which extends through plate 25 and a similar plate 27 bridging the space between and bearing at its end upwardly against arms 18, a washer and a nut 29 fitting on the upper end of the bolt and holding the spring under tension.

To maintain the presser foot in a substantially vertical position throughout its entire travel in feeding hay from the hopper into the baling chamber and in withdrawing to a position above the hopper, I provide a pair of links 30 which pivotally connect the upper end of the presser foot with the upper ends of the standards 15.

In Sheets 4, 5 and 6, parts identical in construction and function with parts of Sheets 1 to 3 inclusive, are correspondingly numbered. In said Sheets 4 to 6 inclusive, I use a pinion segment 31 in place of the gear pinion and axially of the said segment it is provided with a transverse shaft 32 which extends through longitudinal slots 33 in the side walls of the baling case and is equipped at its ends with rollers 34 traveling upon and between pairs of spaced tracks 35 and 36 secured externally to the baling case, it being noted in this connection that the pinion segment consists of two members correspondingly numbered and that there is a pair of fixed overlying rack bars 37 cast or otherwise rigidly formed with the bridge plate 38 mounted on the sides of the frame and forming a substitute for the single rack bar 10 of Sheets 1 to 3 inclusive. In Sheets 4 to 6 inclusive, the head block of the plunger is also provided with extension sides 39 fitting against the inner side of the baling chamber and provided with short longitudinal slots 40 wherein travel flanged rollers 41 journaled upon the shaft 32 and forming a means to guard against tilting of the head block of the plunger. The pitman 8 pivotally connected at one end to crank 7, is pivotally connected at 42 to the pinion segment, and the latter is also pivotally connected at 43 by a link 44 with the head block or plunger at 45, it being noted that radial planes intersecting the axis of the pinion segment from pivots 42 and 43 extend at an angle to each other. The feeder mechanism for forcing baling material from the hopper into the baling chamber in advance of the head block or plunger corresponds substantially to that shown in Sheets 1 to 3 inclusive. As in the former sheets, 15 indicates the standards extending upward from the baling case and 16 the transverse shaft journaled in said standards. 46 is a casting journaled on said shaft and provided with a pair of arms 47 pivotally connected at 48 to a link 49 pivotally connected to the pinion segment 31 at 50 as distinguished from the links 20 which are pivotally connected to the reciprocatory rack bar 12. 21 are levers pivotally connected at 48 to arms 47 and also connected to the presser foot 22 as in Sheets 1 to 3 inclusive, and said levers 21 are held pressed flatly against the casting 46 by clamp plate 24 through the instrumentality of a spring 25, a rod 26 extending through said plate 24 and casting 46 and said spring and a washer 28 and nut 29 engaging the upper end of the spring and rod respectively, and to maintain the presser foot in substantially vertical position it is pivotally connected as hereinbefore explained to the standards 15 by the links 30.

Referring first to the operation of the construction shown in Sheets 1 to 3 inclusive, and assuming that the feeder is elevated, the head block or plunger is advanced, and the crank is being turned in the direction indicated by the arrow Fig. 1, it will be seen that the pitman is about to start in the direction indicated by the adjacent arrow, and hence utilize the pinion 9 as a lever fulcrumed at its upper side on rack bar 10, to effect withdrawing movement of rack bar 12 and the head block or plunger and downward movement of the feeder. The initial part of the withdrawal movement of the head block or plunger is relatively slow but increases rapidly owing to the fact that the leverage decreases as the pivotal point of connection between the pitman and the pinion gradually approaches nearer to the fulcrum point, that is to say moves convergingly upward with respect to the end of the rack bar remote from the hopper, and in this connection it will be apparent that owing to the gradual increase in speed of the withdrawal movement of the plunger, the downward movement of the feeder likewise becomes more rapid and hence more effective in overcoming resistance of the baling material, as the latter becomes closely bunched in the baling chamber, as will be readily understood by reference to Fig. 2, which figure also shows that the head block or plunger has nearly completed its withdrawal stroke before the lower end of the feeder passes from the hopper into the baling chamber, and for this reason there is no chance of conflict between the head block or plunger and the feeder. At the end of a half revolution of the crank, the latter is in the position shown in Fig. 2, so that as its rotation continues, the initial advance movement of the head block or plunger and upward movement of the feeder is very rapid owing to the long leverage which the pinion 9, has on the rack bar 12. This rapid preliminary movement of the head block or plunger is desirable because it occurs when the baling material is loose and offers but little resistance and when the least power or force is required. As the head block or plunger is advanced the leverage thereon is diminished by diverging movement of the pivotal point of connection of the pitman with the pinion from the said "remote" end of the rack bar 10, and as the first revolution of the crank is completed the advance movement of the head block or plunger is slow but powerful, owing to the fact that the pivotal point of connection between the pitman and the pinion 9 is very close to the point where said pinion applies its power on the rack bar 12. It will be obvious that the upward movement of the feeder diminishes in speed as the advance of the plunger slows down, owing to the fact that the said elements are linked together.

Referring now to Sheets 4 to 6 inclusive, in which the crank of course operates in the same direction as in Sheets 1 to 3 inclusive, it is desired to call attention to two features of construction which in principle are believed to be the same as in Sheets 1 to 3 inclusive but which are believed to possess advantages not possessed by the latter type of construction. The construction shown by Sheets 4 to 6 inclusive provides for more powerful compression at the extreme end of the advance stroke of the plunger and thus produces a more compact bale, and owing to the connection of the feeder with the pinion segment instead of with the head block or plunger, the leverage on the feeder is increased at the time when power is most required, namely at the moment the feeder enters the baling case, when it is desirable that the baling material shall be condensed to the greatest extent as by giving the feeder additional power at such time, larger charges of baling material may be introduced within the hopper and the entire operation of baling be thereby facilitated.

Referring now in detail to the operation of the construction shown by Sheets 4 to 6 inclusive, it will be seen that as the crank moves downward from the horizontal position shown in Fig. 5, it exerts a pull on the pinion segment 31 whereby the latter swings on the rack bars 37 as a fulcrum, and begins to withdraw the head block or plunger, through the instrumentality of the link 44, and the feeder is caused to descend through the connections between the same and the segment, continued movement of the pitman resulting in its pivot 42 traveling diagonally upward toward the end of the rack bars remote from the hopper, and thereby diminishing the leverage on the crank of the segment and effecting an increase in the speed of withdrawal movement of the head block or plunger and the descending movement of the feeder. It will be noticed, however, that owing to the fact that the pivotal point 50 moves continually nearer to the fulcrum or rack bar on which the segment travels, the leverage on the feeder is increased and its speed of downward movement is proportionately diminished so that its maximum power is available for effecting the greatest possible condensation of the baling material in the baling chamber in advance of the head block or plunger. As the rotation of the crank continues from the position shown in Fig. 6, the pinion segment swings under the pressure of pitman 8 and imparts rapid advance movement to the head block or plunger and upward movement to the feeder, the movement of the latter being relatively slow but sufficiently rapid to avoid conflict with the advancing head block or plunger. When the plunger has made something more than half of its advance stroke, the crank 7, pivot 42, pivot 43 and pivot 45 are alined, and at that moment the pressure of the head block or plunger on the baling material is equal to that imposed by the crank on the pitman. Under the remainder of the second half revolution of the crank, the parts move from the position shown in dotted lines Fig. 6, to the position shown in full lines Fig. 5, in which latter position it will be noticed that pivot 43 is above the plane occupied by pivots 7 and 42 and the inclined plane occupied by pivots 42 and 45, and that this final movement of the head block or plunger occurs with the maximum power developed by the machine, that is with a greater power than that which is imposed by the crank when the four pivots mentioned are alined as shown in dotted lines Fig. 6, it being understood that this extra or excess power is of course obtained by a decrease in the speed of the advance movement of the plunger. It will be understood that the segment—when it has attained the position shown by dotted lines Fig. 6—constitutes one member of a toggle of which the link 44 constitutes the other member, and that after the parts have attained the position mentioned, the crank 7 utilizes the segment as a long lever fulcrumed on the rack-bar tooth nearest the head-block or plunger, for expanding said toggle and thereby effecting advance movement of the head-block or plunger from the said dotted position to the position shown in Fig. 5. By thus straightening or expanding the toggle after the application of direct power by the crank upon the head block or plunger ceases, as when the parts are in the position shown by dotted lines Fig. 6, a compound leverage is obtained whereby the baling material is compressed to greater density than is possible by any direct application of power from the crank.

From the above description it will be apparent that I have produced a baling press embodying the features of advantage enumerated as desirable and I wish it to be understood that while I have illustrated and described the preferred embodiment of the invention I reserve the right to make all changes falling within the spirit and scope of the appended claims.

I claim:—

1. In a baling press, a baling case, a reciprocatory head block therein, a fixed part, a lever having a rolling fulcrum engagement with said bar, a pitman pivotally connected to said lever to cause the same to roll along said part in opposite directions alternately, and means actuated by the movement of said lever for imparting the power stroke and withdrawal stroke to the head-block.

2. In a baling press, a baling case, a reciprocatory head-block therein, a fixed rack bar extending longitudinally of the press, a toothed lever to travel along and constantly fulcrum on said rack-bar, a pitman to effect advance and retrograde travel of said lever, and means actuated by the rolling advance or retrograde movement of the lever for imparting advance or withdrawal movement to the head block.

3. In a baling press, a baling case, a reciprocatory head block, a fixed longitudinally extending bar, a lever to roll along and constantly change its fulcrum point on said bar, a pitman to effect advance and retrograde travel of said lever, and a link pivotally connecting said lever with the head-block and forming with the lever, a toggle between the head block and a point along the length of said bar.

4. In a baling press, a baling case, a reciprocatory head block, a fixed longitudinally extending bar, a lever to roll along and constantly change its fulcrum point on said bar, a pitman to effect advance and retrograde travel of said lever, a link pivotally connecting said lever with the head-block and forming with the lever, a toggle between the head block and a point along the length of said bar, a pivoted feeder to force baling material into the baling chamber, and connections between said lever and said feeder for effecting upward movement of the latter, as the head-block is advanced and downward movement of the feeder as the head block is withdrawn.

5. In a baling press, a baling case, a reciprocatory head block, a fixed longitudinally extending bar, a lever to roll along and constantly change its fulcrum point on said bar, a pitman to effect advance and retrograde travel of said lever, a link pivotally connecting said lever with the head block and forming with the lever, a toggle between the head block and a point along the length of said bar, a pivoted feeder, and a link pivotally connecting the feeder with said lever so that the leverage of the lever on the feeder shall diminish as the feeder is swung upward and shall increase as the feeder makes its opposite or power stroke.

6. In a baling press, a baling case, a reciprocatory head block therein, a rack bar extending longitudinally of the case, a lever in the form of a pinion segment intermeshed with said rack bar, a link pivotally connecting said pinion segment with said head block, and a pitman pivotally connected at its front end with said pinion segment.

7. In a baling press, a baling case, a reciprocatory head-block therein, a rack bar extending longitudinally of the case, a lever in the form of a pinion segment intermeshed with said rack bar, a link pivotally connecting said pinion segment with the head-block, a pitman pivotally connected at its front end with said pinion segment, a pivoted feeder for operating in a vertical plane, and a link pivotally connecting the feeder with said pinion segment.

8. In a baling press, a baling case, a driven crank shaft, a fixed rack bar extending longitudinally of the case, a reciprocatory head block in the case, a pinion segment intermeshed with the rack bar, a pitman pivotally connecting the crank shaft with the pinion segment, a link pivotally connecting the pinion segment with the head block, and means for retaining the pinion segment in mesh with the rack bar without interfering with its travel thereon.

9. In a baling press, a baling case having longitudinal slots in its side walls, a fixed rack bar extending longitudinally of the case and facing downward, a pinion segment engaging the rack bar and having a shaft projecting through the said slots, rollers mounted on said shaft, upper and lower track bars at opposite sides of and engaged by said rollers to retain the pinion segment in engagement with the rack bar without interfering with the travel thereof, a reciprocatory head block in the case, means to impart rolling travel to the pinion on the rack bar, and a link pivotally connecting the pinion segment with the head block.

10. In a baling press, a baling case having longitudinal slots in its side walls, a fixed rack bar extending longitudinally of the case and facing downward, a pinion segment engaging the rack bar and having a shaft projecting through the said slots, rollers mounted on said shaft, upper and lower track bars at opposite sides of and engaged by said rollers to retain the pinion segment in engagement with the rack bar without interfering with the travel thereof, a reciprocatory head block in the case, having longitudinally slotted side walls through which said shaft projects, guide rollers mounted on said shaft and engaging the slots of the head block side walls, means to impart rolling travel to the pinion on the rack bar, and a link pivotally connecting the pinion segment with the head block.

In testimony whereof I affix my signature in presence of two witnesses.

CHARLES L. COOKSON.

Witnesses:
CHAS. W. GERARD,
G. Y. THORPE.

---

Copies of this patent may be obtained for five cents each, by addressing the "Commissioner of Patents, Washington, D. C."